US010141002B2

(12) United States Patent
Ewer et al.

(10) Patent No.: US 10,141,002 B2
(45) Date of Patent: Nov. 27, 2018

(54) COMMUNICATION DEVICES AND METHODS FOR TEMPORAL ANALYSIS OF VOICE CALLS

(71) Applicant: Plantronics, Inc., Santa Cruz, CA (US)

(72) Inventors: Paul A Ewer, Santa Cruz, CA (US); Nicholas K Eisner, Ben Lomond, CA (US); Ian J Gould, Malmesbury (GB); Robert J Kelly, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 178 days.

(21) Appl. No.: 14/310,412

(22) Filed: Jun. 20, 2014

(65) Prior Publication Data
US 2015/0371652 A1 Dec. 24, 2015

(51) Int. Cl.
G10L 25/48 (2013.01)
G10L 25/78 (2013.01)
G10L 21/02 (2013.01)
H04R 1/08 (2006.01)
H04M 3/493 (2006.01)

(52) U.S. Cl.
CPC .............. G10L 21/02 (2013.01); G10L 25/48 (2013.01); H04R 1/08 (2013.01); G10L 25/78 (2013.01); H04M 3/4936 (2013.01)

(58) Field of Classification Search
CPC ......... G10L 21/02; G10L 25/48; G10L 25/78; H04R 1/08; H04M 3/4936
USPC ........................................................ 704/201
See application file for complete search history.

(56) References Cited

U.S. PATENT DOCUMENTS

| 6,757,361 | B2 | 6/2004 | Blair et al. | |
| 2004/0172252 | A1* | 9/2004 | Aoki | H04M 3/564 704/270 |
| 2007/0121824 | A1* | 5/2007 | Agapi | H04M 3/5175 379/88.18 |
| 2008/0167878 | A1 | 7/2008 | Hause et al. | |
| 2008/0260169 | A1* | 10/2008 | Reuss | H04R 1/10 381/58 |
| 2009/0292541 | A1 | 11/2009 | Daya et al. | |
| 2011/0208522 | A1 | 8/2011 | Pereg et al. | |
| 2012/0296642 | A1 | 11/2012 | Shammass et al. | |
| 2013/0028399 | A1* | 1/2013 | Kopparapu | H04M 3/5175 379/88.01 |

(Continued)

FOREIGN PATENT DOCUMENTS

WO  WO 2007/080517 A2  7/2007

OTHER PUBLICATIONS

International Search Report and Written Opinion dated Oct. 5, 2015, for PCT Application No. PCT/US2015/033603.

(Continued)

Primary Examiner — Bharatkumar S Shah
(74) Attorney, Agent, or Firm — Chuang Intellectual Property Law

(57) ABSTRACT

Headsets having corresponding audio adapters and methods comprise: a microphone configured to generate analog audio for a voice call; an analog-to-digital converter configured to convert the analog audio to digital audio; a voice activity detector configured to detect speech in the digital audio; a processor configured to i) determine a temporal characteristic of the speech, and ii) generate a message based on the temporal characteristic of the speech and a temporal characteristic of the voice call; and a transmitter configured to transmit the message.

17 Claims, 4 Drawing Sheets

(56) References Cited

U.S. PATENT DOCUMENTS

2013/0208881 A1 8/2013 Pande et al.
2014/0093091 A1 4/2014 Dusan et al.
2015/0310877 A1* 10/2015 Onishi .................... H04M 3/51
 704/246

OTHER PUBLICATIONS

Pallotta et al., "Interaction Mining: the New Frontier of Call Center Analytics," found at URL http://www.researchgate.net/profile/Vincenzo_Pallotta/publication/265145028_Interaction_Mining_the_new_frontier_of_Call_Center_Analytics/links/542beb900cf27e39fa91bea2.pdf, Jan. 1, 2011.

Pandharipande et al., "A Language Independent Approach to Identify Problematic Conversation in Call Centers," ECTI Transactions on Computer and Information Technology, 7(2):146-155.

Unknown, "Speech Analytics, Innovative Speech Technologies to Unveil Hidden Insights," found at URL http://www.nice.com/speech-analytics, on Sep. 11, 2014.

* cited by examiner

COMMUNICATION DEVICES AND METHODS FOR TEMPORAL ANALYSIS OF VOICE CALLS

FIELD

The present disclosure relates generally to the field of audio processing. More particularly, the present disclosure relates to analysis of voice calls.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Customer calls into a business can often be emotional events. The customer is calling for help to solve a problem. If a customer and an employee are having difficulty in reaching an agreed resolution the call may become problematic. Keeping a customer, and solving the customer's problem, are very important to repeat business opportunities. Therefore it is desirable to identify problematic customer calls.

Some conventional approaches employ software to analyze the content of the call in an attempt to identify words or phrases that may indicate a problem call. However, such approaches tend to be processor-intensive, and so cannot be applied in real time. In addition, the required software may be prohibitively expensive to purchase.

SUMMARY

In general, in one aspect, an embodiment features a headset comprising: a microphone configured to generate analog audio for a voice call; an analog-to-digital converter configured to convert the analog audio to digital audio; a voice activity detector configured to detect speech in the digital audio; a processor configured to i) determine a temporal characteristic of the speech, and ii) generate a message based on the temporal characteristic of the speech and a temporal characteristic of the voice call; and a transmitter configured to transmit the message.

Embodiments of the headset may include one or more of the following features. In some embodiments, the processor is further configured to determine an interval elapsing between i) transfer of the voice call to the headset, and ii) occurrence of the speech; and the message describes the interval. In some embodiments, the transmitter is further configured to transmit the digital audio. In some embodiments, wherein the voice activity detector is a first voice activity detector, wherein the audio is first audio, and wherein the speech is first speech, the headset further comprises: a receiver configured to receive second digital audio; and a voice activity detector configured to detect second speech in the second digital audio; wherein the processor is further configured to determine the temporal characteristic of the voice call based on the second speech. In some embodiments, the processor is further configured to determine at least one of: a first parameter representing a duration of contemporaneous occurrence of the first speech and the second speech, a second parameter representing a ratio of i) a duration of the first speech and ii) a duration of the second speech, and a third parameter representing a duration of no speech and at least one of iii) a duration of the first speech and iv) a duration of the second speech; and the message includes at least one of the first parameter, the second parameter, and the third parameter. In some embodiments, wherein the analog audio is first analog audio, the headset further comprises: a digital-to-analog converter configured to convert the second digital audio to second analog audio; and a speaker configured to generate sound based on the second analog audio. In some embodiments, the processor is further configured to determine amplitudes of the first speech and the second speech; and the message describes the amplitudes of the first speech and the second speech.

In general, in one aspect, an embodiment features an audio adapter comprising: a headset interface configured to receive analog audio for a voice call; an analog-to-digital converter configured to convert the analog audio to digital audio; a voice activity detector configured to detect speech in the digital audio; a processor configured to i) determine a temporal characteristic of the speech, and ii) generate a message based on the temporal characteristic of the speech and a temporal characteristic of the voice call; and a host interface configured to transmit the message.

Embodiments of the audio adapter may include one or more of the following features. In some embodiments, the processor is further configured to determine an interval elapsing between i) transfer of the voice call to the audio adapter, and ii) occurrence of the speech; and the message describes the interval. In some embodiments, the host interface is further configured to transmit the digital audio. In some embodiments, wherein the audio is first audio, and wherein the speech is first speech, the audio adapter further comprises: a second voice activity detector configured to detect second speech in the second digital audio; wherein the processor is further configured to determine the temporal characteristic of the voice call based on the second speech. In some embodiments, the processor is further configured to determine at least one of: a first parameter representing a duration of contemporaneous occurrence of the first speech and the second speech; a second parameter representing a ratio of i) a duration of the first speech and ii) a duration of the second speech; and a third parameter representing a duration of no speech and at least one of iii) a duration of the first speech and iv) a duration of the second speech; and the message includes at least one of the first parameter, the second parameter, and the third parameter. Some embodiments comprise a digital-to-analog converter configured to convert the second digital audio to second analog audio. In some embodiments, the processor is further configured to determine amplitudes of the first speech and the second speech; and the message describes the amplitudes of the first speech and the second speech.

In general, in one aspect, an embodiment features a method for a headset comprising: generating analog audio for a voice call; converting the analog audio to digital audio; detecting speech in the digital audio; determining a temporal characteristic of the speech; generating a message based on the temporal characteristic of the speech and a temporal characteristic of the voice call; and transmitting the message.

Embodiments of the method may include one or more of the following features. determining an interval elapsing between i) transfer of the voice call to the headset, and ii) occurrence of the speech; and describing the interval in the message.

In some embodiments, wherein the audio is first audio, and wherein the speech is first speech, the method further comprises: receiving second digital audio; detecting second speech in the second digital audio, and determining the temporal characteristic of the voice call based on the second speech. Some embodiments comprise determining at least one of a first parameter representing a duration of contemporaneous occurrence of the first speech and the second speech, a second parameter representing a ratio of i) a duration of the first speech and ii) a duration of the second speech, and a third parameter representing a duration of no speech and at least one of iii) a duration of the first speech and iv) a duration of the second speech; and including at least one of the first parameter, the second parameter, and the third parameter in the message. In some embodiments, wherein the analog audio is first analog audio, the method further comprises: converting the second digital audio to second analog audio; and providing the second analog audio to a speaker of the headset. Some embodiments comprise determining amplitudes of the first speech and the second speech; and describing the amplitudes of the first speech and the second speech in the message.

The details of one or more implementations are set forth in the accompanying drawings and the description below. Other features will be apparent from the description and drawings, and from the claims.

Figure 1:
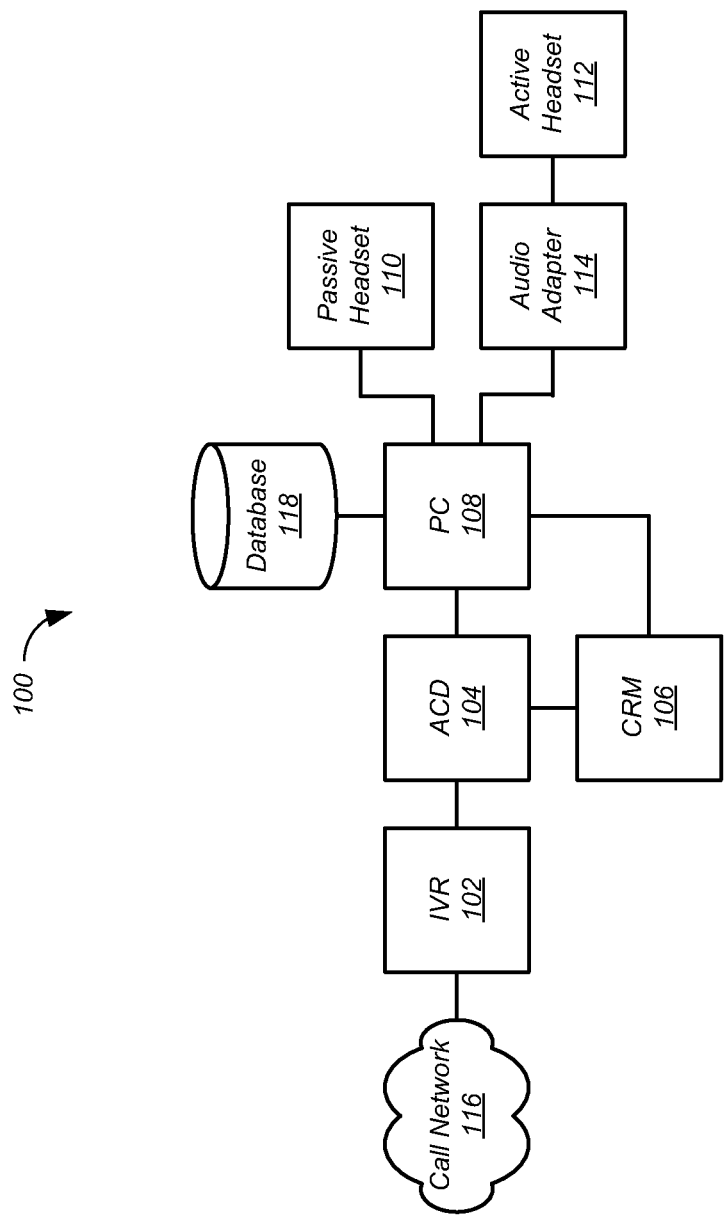
FIG. 1 shows elements of a contact center according to one embodiment.

The leading digit(s) of each reference numeral used in this specification indicates the number of the drawing in which the reference numeral first appears.

DETAILED DESCRIPTION

Embodiments of the present disclosure provide communication devices and methods for temporal analysis of voice calls. While some conventional approaches to voice call analysis examine the content of the speech in a voice call, the described embodiments examine the timing of the speech. While the disclosed embodiments are described in context of a voice call between a customer and a customer service agent, the described techniques are applicable to any voice call, and to any number of voice call participants. And while the disclosed embodiments are variously described as implemented in a headset, or in an audio adapter for connecting a headset with a host, the described techniques may be applied to other suitable communication devices. Other features are contemplated as well.

Several useful metrics may be collected by temporal analysis of a voice call. Any of these metrics may be used to identify a problematic voice call. One such metric, which may be referred to as "crosstalk" or "doubletalk," refers to events where the customer and the customer service agent speak at the same time. The occurrence of crosstalk, or duration of crosstalk in excess of a selected threshold, may be used to trigger an alert message to be sent from the communication device to a supervisor. In addition, an indicator of the crosstalk may be displayed on a monitor for the customer service agent.

Another voice call metric that may be collected by temporal analysis of a voice call, which may be referred to as "talk vs. listen," measures the amounts or relative amounts of conversation contributed by each party to a voice call or portion of a voice call, and may be expressed as a ratio. Some customer service calls are expected to be driven primarily by the customer, others by the customer service agent. The "talk vs. listen" metric can be used to determine best practices for a particular call type, for a particular customer type, and the like, based on successful customer contacts. The amount of silence during the voice call may also be incorporated into these metrics. For example, the metrics may include a ratio of customer speech amount to silence, a ratio of total speech amount to silence, and the like. These metrics may be compared to established baselines to assist with coaching and improvement of customer service agent performance.

Another voice call metric that may be collected by temporal analysis of a voice call measures a speed of response of a customer service agent in answering a customer service call. For example, the metric may describe an interval elapsing between transfer of a voice call to the headset of the customer service agent and occurrence of speech in the voice call. In most cases, the agent will speak first, but in some cases, the customer may speak first. The metric may identify the first speaker. The transfer of the call to the agent may be initiated by an automatic call distributor or by the agent, for example by a button press on the agent's headset.

In various embodiments, these metrics may be reported routinely by a communication device to a host, by push or pull technology, for action in real time or later analysis. In some embodiments, a metric exceeding a selected threshold may trigger the communication device to send a message to the host, for example to a supervisor for immediate action or for routine reporting. The message may include the metrics collected.

FIG. 1 shows elements of a contact center 100 according to one embodiment. Although in the described embodiment elements of the contact center 100 are presented in one arrangement, other embodiments may feature other arrangements. For example, elements of contact center 100 may be implemented in hardware, software, or combinations thereof. As another example, various elements of the contact center 100 may be implemented as one or more digital signal processors. In the present disclosure, the contact center 100 is described in terms of an agent in a call center. However, the techniques described herein are applicable to any headset user in any environment.

Referring to FIG. 1, the contact center 100 may include an interactive voice response (IVR) system 102, an automatic call distributor 104, a customer relationship management (CRM) system 106, and a personal computer (PC) 108. A contact center agent may use an active headset 110 connected directly to the PC 108, or may use a passive headset 112 connected to the PC 108 by an audio adapter 114. The active headset 110 may be wired or wireless.

The agent may log on using the PC 108, and in some cases, the CRM system 106. The logon may be automated. For example, the PC 108, and in some cases the CRM system 106, may recognize a serial number of the headset 110, 112 as belonging to the agent, and therefore automatically logon the agent.

The IVR system 102 may receive calls from a call network 116, provide voice prompts to the customer, and based on responses to the voice prompts, route the call to the ACD 104. The ACD 104 may route the call to an agent selected on the basis of factors such as the agent's availability and areas of expertise.

The active headset 110 or the audio adapter 114 may determine audio characteristics of the speech in the call, including temporal characteristics of the speech, and generate messages describing the determined audio characteristics. For example, the message may include measures of how often the customer and agent are speaking at the same time (that is, "crosstalk"), a ratio of the time during which the customer is speaking and the time during which the agent is speaking (that is, "talk vs. listen"), how fast the agent answers the call, and the like. The messages are sent to the PC 108, where they may be augmented by other data such as agent ID, time of day, and the like. The messages may be collected in a database 118 that may reside locally or remotely, and may be sent to the agent or a supervisor.

Figure 2:
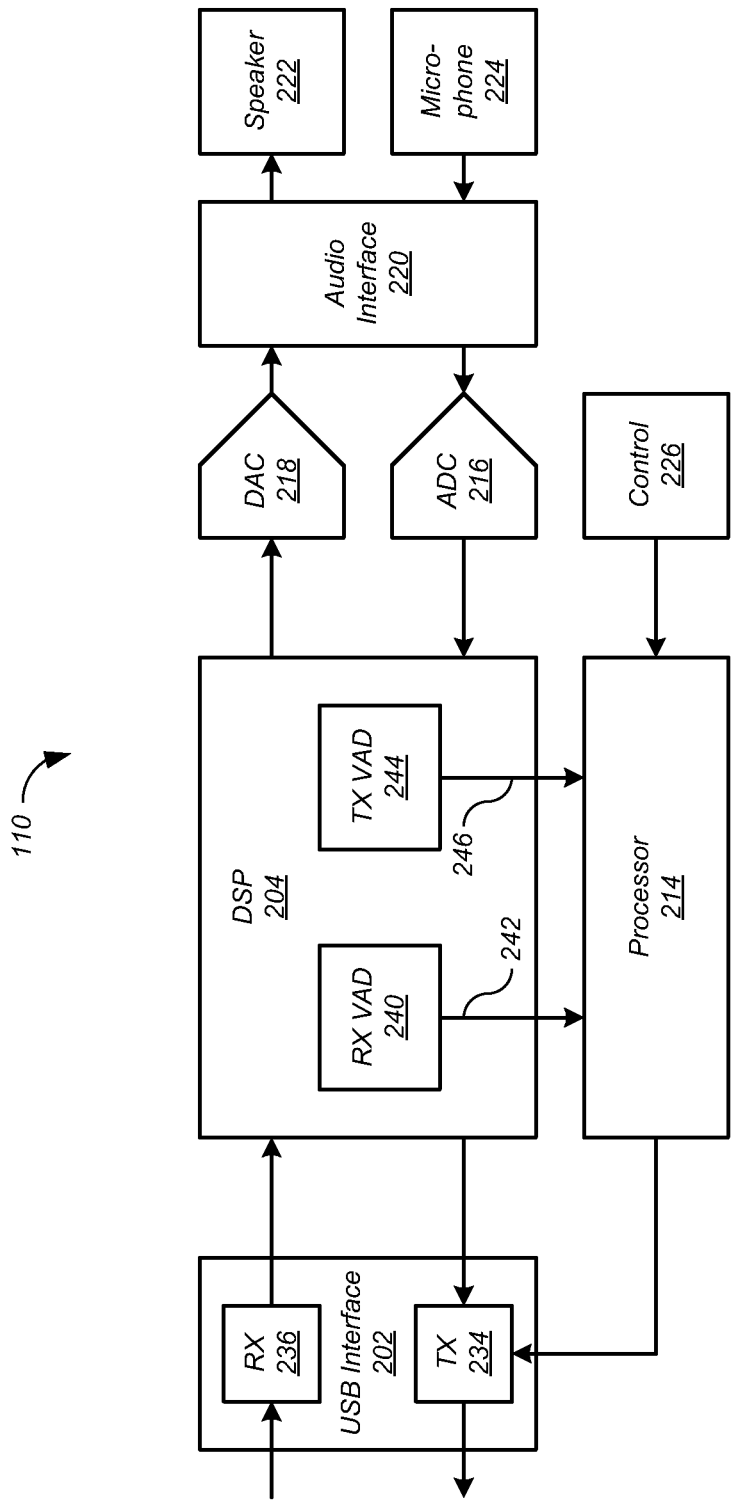
FIG. 2 shows elements of the active headset of FIG. 1 according to one embodiment.

FIG. 2 shows elements of the active headset 110 of FIG. 1 according to one embodiment. Although in the described embodiment elements of the active headset 110 are presented in one arrangement, other embodiments may feature other arrangements. For example, elements of the active headset 110 may be implemented in hardware, software, or combinations thereof. As another example, various elements of the active headset 110 may be implemented as one or more digital signal processors. Various elements of the active headset 110 may be implemented as one or more integrated circuits. In the present disclosure, the active headset 110 is described in terms of an agent in a call center. However, the techniques described herein are applicable to any headset user in any environment. And while in the described embodiment the active headset 110 is connected to the PC 108 by a universal serial bus (USB) cable, the described techniques apply to other wired headsets and wireless headsets as well.

Referring to FIG. 2, the active headset 110 includes a USB interface 202, a digital signal processor (DSP) 204, a processor 214, an analog-to-digital converter (ADC) 216, a digital-to-analog converter (DAC) 218, an audio interface 220, a speaker 222, a microphone 224, and a control 226.

The USB interface 202 may implement a USB protocol for communication with the PC 108. The USB interface 202 may include a transmitter (TX) 234 and a receiver (RX) 236. The audio interface 220 may provide signal conditioning for audio provided to the speaker 222 and audio received from the microphone 224. The DSP 204 may perform volume control, equalization, sample rate conversion, noise reduction, sound pressure limitation, and the like. The DSP 204 may include one or more voice activity detectors (VAD). In particular, the DSP 204 may include a receive voice activity detector (RX VAD) 240 and a transmit voice activity detector (TX VAD) 244. The RX VAD 240 may provide a signal 242 that indicates whether speech is present in the audio received from the USB interface 202. The TX VAD 244 may provide a signal 246 that indicates whether speech is present in the audio received from the audio interface 220. For example, each signal 242, 246 may be a binary signal, with one value representing the presence of speech and the other value representing the absence of speech. The signals 242, 246 of the VADS 240, 244 may be used by the processor 214 to determine the timing of the speech of the customer and the timing of the speech of the agent.

Figure 3:
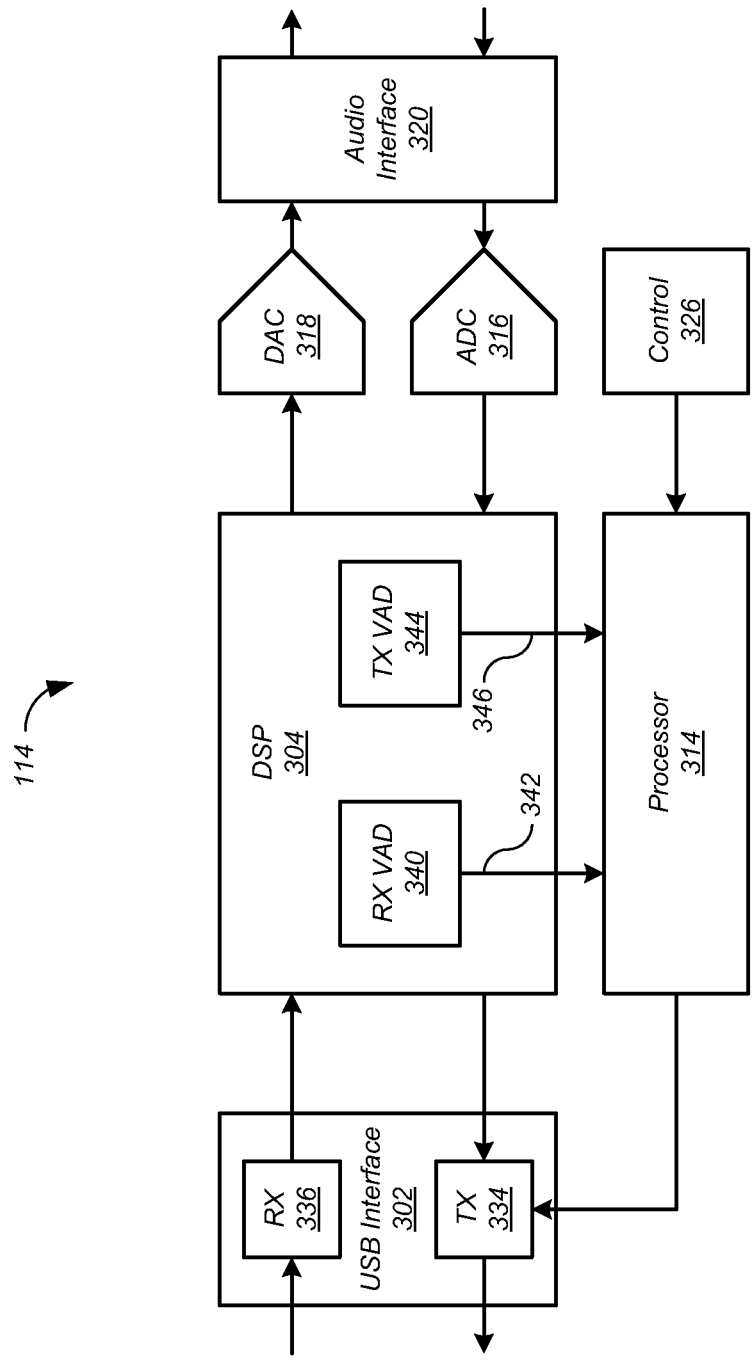
FIG. 3 shows elements of the audio adapter of FIG. 1 according to one embodiment.

FIG. 3 shows elements of the audio adapter 114 of FIG. 1 according to one embodiment. Although in the described embodiment elements of the audio adapter 114 are presented in one arrangement, other embodiments may feature other arrangements. For example, elements of the audio adapter 114 may be implemented in hardware, software, or combinations thereof. As another example, various elements of the audio adapter 114 may be implemented as one or more digital signal processors. In the present disclosure, the audio adapter 114 is described in terms of an agent in a call center. However, the techniques described herein are applicable to any headset user in any environment. And while in the described embodiment the audio adapter 114 is connected to the PC 108 by a universal serial bus (USB) cable, the described techniques apply to other connections as well.

Referring to FIG. 3, the audio adapter 114 includes a USB interface 302, a digital signal processor (DSP) 304, a processor 314, an analog-to-digital converter (ADC) 316, a digital-to-analog converter (DAC) 318, and an audio interface 320. Each of the elements of the audio adapter 114 may be implemented in a manner similar to corresponding elements of the active headset 110 as described with reference to FIG. 2 above, and may operate in a similar manner.

The DSP 304 may include one or more voice activity detectors (VAD). In particular, the DSP 304 may include a receive voice activity detector (RX VAD) 340 and a transmit voice activity detector (TX VAD) 344. The RX VAD 340 may provide a signal 342 that indicates whether speech is present in the audio received from the USB interface 402. The TX VAD 344 may provide a signal 346 that indicates whether speech is present in the audio received from the audio interface 320. For example, each signal 342, 346 may be a binary signal, with one value representing the presence of speech and the other value representing the absence of speech. The signals 342, 346 of the VADS 340, 344 may be used by the processor 314 to determine the timing of the speech of the customer and the timing of the speech of the agent.

Figure 4:
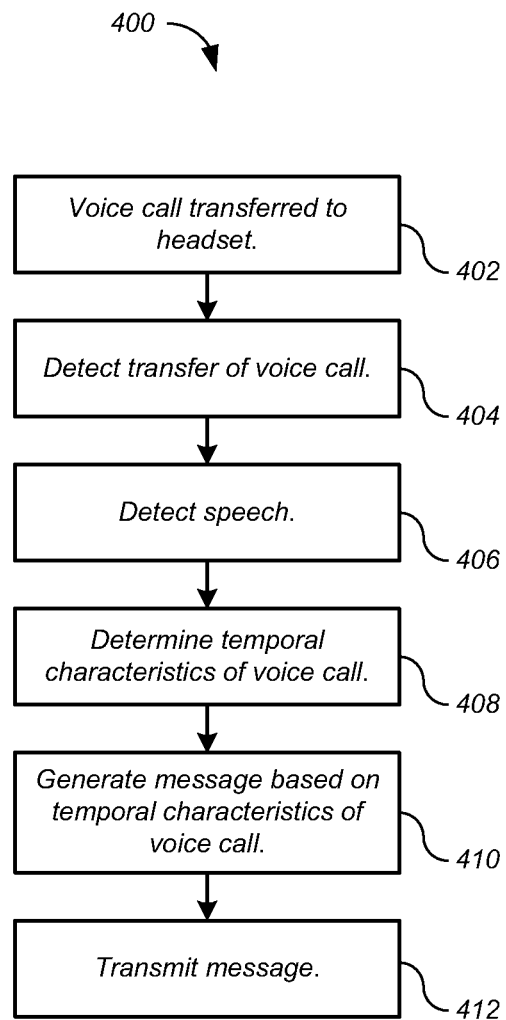
FIG. 4 shows a process for the active headset and audio adapter of FIGS. 1-3 according to one embodiment.

FIG. 4 shows a process 400 for the active headset 110 of FIGS. 1 and 2 according to one embodiment. The audio adapter 114 of FIGS. 1 and 3 may implement a similar process. Although in the described embodiments the elements of process 400 are presented in one arrangement, other embodiments may feature other arrangements. For example, in various embodiments, some or all of the elements of process 400 can be executed in a different order, concurrently, and the like. Also some elements of process 400 may not be performed, and may not be executed immediately after each other. In addition, some or all of the elements of process 400 can be performed automatically, that is, without human intervention.

Referring to FIG. 4, at 402, a voice call may be transferred to the active headset 110. In some embodiments, the call may be transferred automatically by the ACD 104. In some embodiments, the agent may transfer the call, for example by pressing the control 226 on the active headset 110. At 404, the active headset 110 may detect the transfer of the voice call. In the case of a call transferred automatically by the ACD 104, the active headset 110 may detect a zip tone or the like that is provided by the ACD 104. In the case of a call transferred by the agent, the active headset 110 may detect a press of the control 226.

At 406, the active headset 110 may detect speech. The RX VAD 240 may detect speech by the customer. In particular, the receiver 236 may receive digital audio. The RX VAD 240 may detect speech in the digital audio, and may output a signal 242 indicating speech detection. For example, the signal 242 may be a binary flag.

The TX VAD 244 may detect speech by the agent. In particular, the microphone 224 may generate analog audio responsive to the voice of the agent. The ADC 216 may convert the analog audio to digital audio. The TX VAD 244 may detect speech in the digital audio, and may output a signal 246 indicating speech detection. For example, the signal 246 may be a binary flag.

At 408, the processor 214 may determine temporal characteristics of the voice call based on the signals 242, 246 produced by the VADs 240, 244. At 410, the processor 214 may generate a message based on the temporal characteristic of the speech and a temporal characteristic of the voice call. The message may be generated routinely, in response to the value of a temporal characteristic exceeding a threshold, or the like. At 412, the transmitter 234 may transmit the message.

The message may include measures of the speed of response of the agent in answering the call, crosstalk, talk vs. listen, and the like. For example, the processor 214 may determine a measure of the speed of response of the agent in answering the call by determine an interval elapsing between transfer of the voice call to the active headset 110 and occurrence of the speech of the agent. The processor 214 may determine a measure of crosstalk by determining a duration of contemporaneous occurrence of the agent's speech and the customer's speech. The processor 214 may determine a measure of talk vs. listen by determining a ratio of a duration of the agent's speech and a duration of the customer's speech over a selected period. The processor 214 may determine a duration of no speech and a duration of the agent's speech and/or a duration of the customer's speech. The processor 214 may determine other temporal measures of the speech as well.

In other embodiments, each message may include measures of how much time was spent in one or more states since the last message. The states may include one or more of talk, listen, silence, crosstalk, responding to a call, and the like. In such embodiments, the PC 108 may determine the measures of speed of response of the agent in answering calls, crosstalk, talk vs. listen, and the like, based on the messages. The messages may be transmitted to the PC 108 periodically.

The processor 214 may also determine non-temporal measures of the speech. For example, the processor may determine amplitudes of the agent's speech and/or the customer's speech. The processor 214 may determine other non-temporal measures of the speech as well.

The PC 108 may add metadata to the message. For example, the metadata may include a timestamp representing the time and date of the call, a userid for the agent, and other information such as the length of the call, the identity of the customer, the subject of the call, and the like. This metadata may be provided by the PC 108, the IVR system 102, the ACD 104, and the CRM system 106.

The message may be sent directly to a supervisor of the agent for immediate action. The message may be sent to the agent. For example, the PC 108 may display the measures of the call on a monitor for the agent. The message may be stored in the database 118.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A headset comprising:
   a communications interface to receive a remote call participant speech from a remote call participant during a voice call;
   a microphone arranged to receive a headset wearer speech during the voice call;
   a speaker arranged to output the remote call participant speech during the voice call; and
   a processor configured to analyze the remote call participant speech to identify a speech characteristic of the remote call participant and determine a headset wearer call performance utilizing the speech characteristic of the remote call participant, the processor further configured to analyze the headset wearer speech to determine the headset wearer call performance by determining a temporal analysis metric of the speech characteristic of the remote call participant relative to the headset wearer speech, and the processor further configured to send an alert message over the communications interface if the headset wearer call performance indicates a problematic voice call.

2. The headset of claim 1, wherein the communications interface comprises a transmitter and a receiver.

3. The headset of claim 1, further comprising an analog-to-digital converter configured to convert the headset wearer speech from an analog audio to a digital audio.

4. The headset of claim 1, wherein the processor is further configured to determine a time interval between a transfer of the voice call to the headset and a first occurrence of the headset wearer speech.

5. The headset of claim 1, wherein the temporal analysis metric comprises a time duration of contemporaneous occurrence of the headset wearer speech and the remote call participant speech.

6. The headset of claim 1, wherein the temporal analysis metric comprises a ratio of a duration of the headset wearer speech and a duration of the remote call participant speech.

7. The headset of claim 1, wherein the processor is configured to determine the headset wearer call performance by determining a time duration of no speech activity and a time duration of the remote call participant speech.

8. The headset of claim 1, wherein the processor is configured to determine the headset wearer call performance by determining an amplitude of the headset wearer speech relative to the amplitude of the remote call participant speech.

9. A method for monitoring a headset wearer call performance comprising:
    receiving a headset wearer speech at a microphone of a headset from a headset wearer during a voice call;
    receiving a remote call participant speech at the headset from a remote call participant over a communications link for output at a speaker of the headset;
    determining the headset wearer call performance comprising analyzing the remote call participant speech to identify a speech characteristic of the remote call participant;
    determining the headset wearer call performance comprising analyzing the headset wearer speech to identify a speech characteristic of the headset wearer and determining a temporal analysis metric of the speech characteristic of the remote call participant relative to the headset wearer speech; and
    sending an alert message from the headset if the headset wearer call performance indicates a problematic voice call.

10. The method of claim 9, further comprising determining a time interval between a transfer of the voice call to the headset and a first occurrence of the headset wearer speech.

11. The method of claim 9, wherein the temporal analysis metric comprises a time duration of contemporaneous occurrence of the headset wearer speech and the remote call participant speech.

12. The method of claim 9, wherein the temporal analysis metric comprises a ratio of a duration of the headset wearer speech and a duration of the remote call participant speech.

13. The method of claim 9, wherein determining the headset wearer call performance comprises determining a time duration of no speech activity and a time duration of the remote call participant speech.

14. The method of claim 9, wherein determining the headset wearer call performance comprises determining an amplitude of the headset wearer speech relative to an amplitude of the remote call participant speech.

15. An audio adapter comprising:
    a headset interface operable to interface with a headset and configured to receive an analog headset wearer speech audio during a voice call;
    an analog-to-digital converter configured to convert the analog headset wearer speech audio to a digital headset wearer speech audio;
    a voice activity detector configured to detect a headset wearer speech in the digital headset wearer speech audio;
    a host interface operable to interface with a host device and configured to receive a remote call participant speech from a remote call participant from the host device for transmission to the headset over the headset interface; and
    a processor configured to analyze the remote call participant speech to identify a speech characteristic of the remote call participant and determine a headset wearer call performance utilizing the speech characteristic of the remote call participant, the processor further configured to analyze the digital headset wearer speech audio to determine the headset wearer call performance by determining a temporal analysis metric of the speech characteristic of the remote call participant relative to the headset wearer speech, and further configured to send an alert message over the host interface if the headset wearer call performance indicates a problematic voice call.

16. The audio adapter of claim 15, wherein the temporal analysis metric comprises a time duration of contemporaneous occurrence of the headset wearer speech and the remote call participant speech.

17. The audio adapter of claim 15, wherein the temporal analysis metric comprises a ratio of a duration of the headset wearer speech and a duration of the remote call participant speech.

* * * * *